United States Patent [19]
Petetin

[11] 3,747,788
[45] July 24, 1973

[54] METHOD AND MEANS FOR CONSTRUCTING AND TRANSPORTING PRE-FABRICATED HOUSES

[76] Inventor: Paul Arsene Jean Gabriel Petetin, 101 Ave. Castermant, 77 Chelles, France

[22] Filed: July 13, 1971

[21] Appl. No.: 162,146

[30] Foreign Application Priority Data
July 24, 1970 France .............................. 70.27448

[52] U.S. Cl................ 214/512, 214/515, 280/34 A, 280/423 R, 180/79.2 B
[51] Int. Cl. ............................................. B60p 1/02
[58] Field of Search..................... 214/505, 506, 512, 214/515; 280/423 R, 423 B, 425 R, 425 A, 34 A, 6 R, 6 H; 180/79.2 B

[56] References Cited
UNITED STATES PATENTS
2,676,783  4/1954  Rogers............................ 214/512 X
2,788,145  4/1957  Clark ................................ 214/505
3,339,942  9/1967  Ratkovich ....................... 280/423 A Primary Examiner—Albert J. Makay
Attorney—William C. Linton et al.

[57] ABSTRACT

This invention relates to prefabricated elements of relatively large dimensions, of reinforced or like molded concrete, incorporating all the necessary equipments, appliances and piping and wiring systems, these elements being adapted to be easily connected at the building site to other similar elements and to be constructed at a manufacturing plant and transported by road within the limits of exceptional transport dimensional tolerances. The invention also includes a trailer adapted to transport these elements and comprising to this end a wheel-mounted platform responsive to hydraulic jacks for steering the trailer axles, longitudinal beams of telescopic type and provided with means for locking them in the selected longitudinal dimension, whereby the trailer may be returned to the plant under no-load conditions without exceeding the prescribed transverse dimensions of ordinary transport vehicles.

3 Claims, 6 Drawing Figures

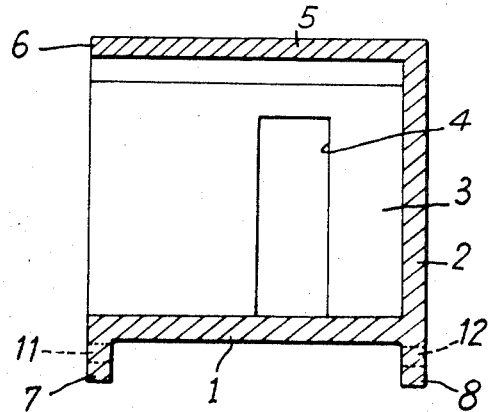
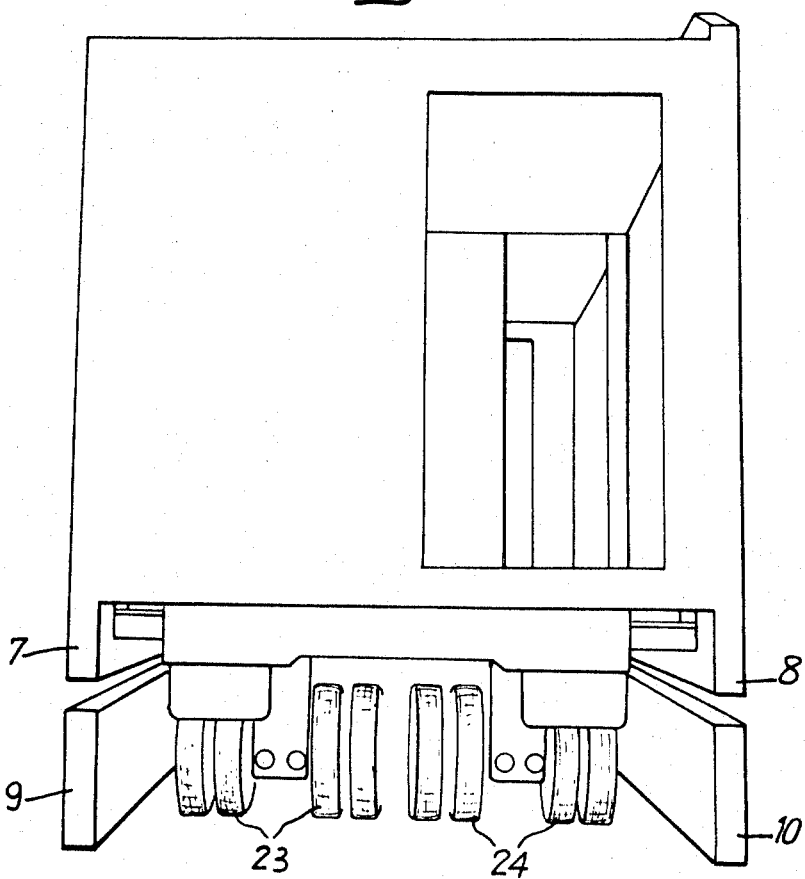

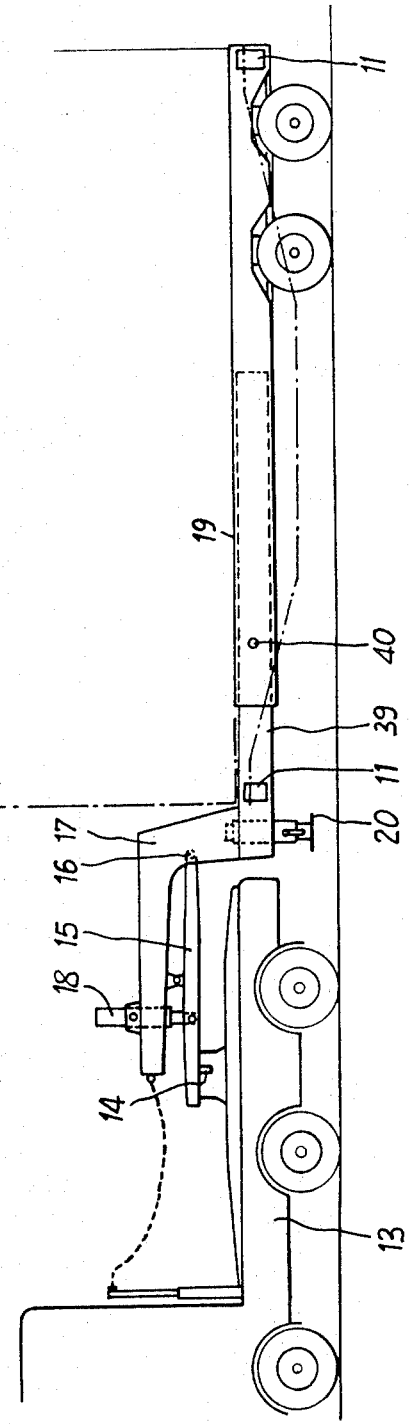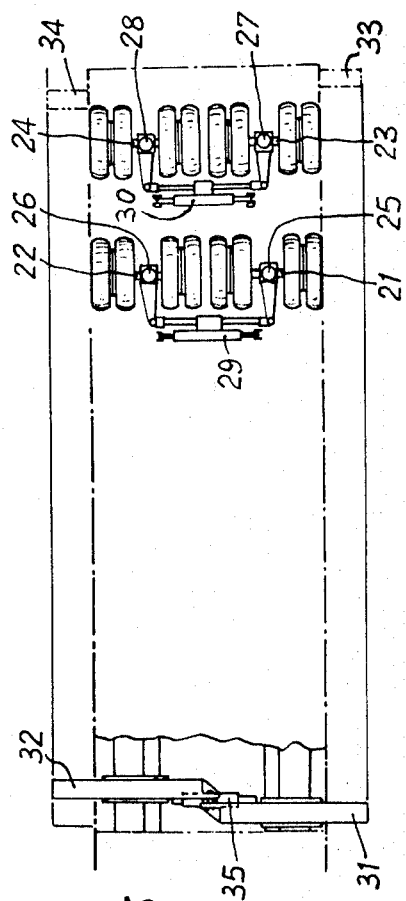

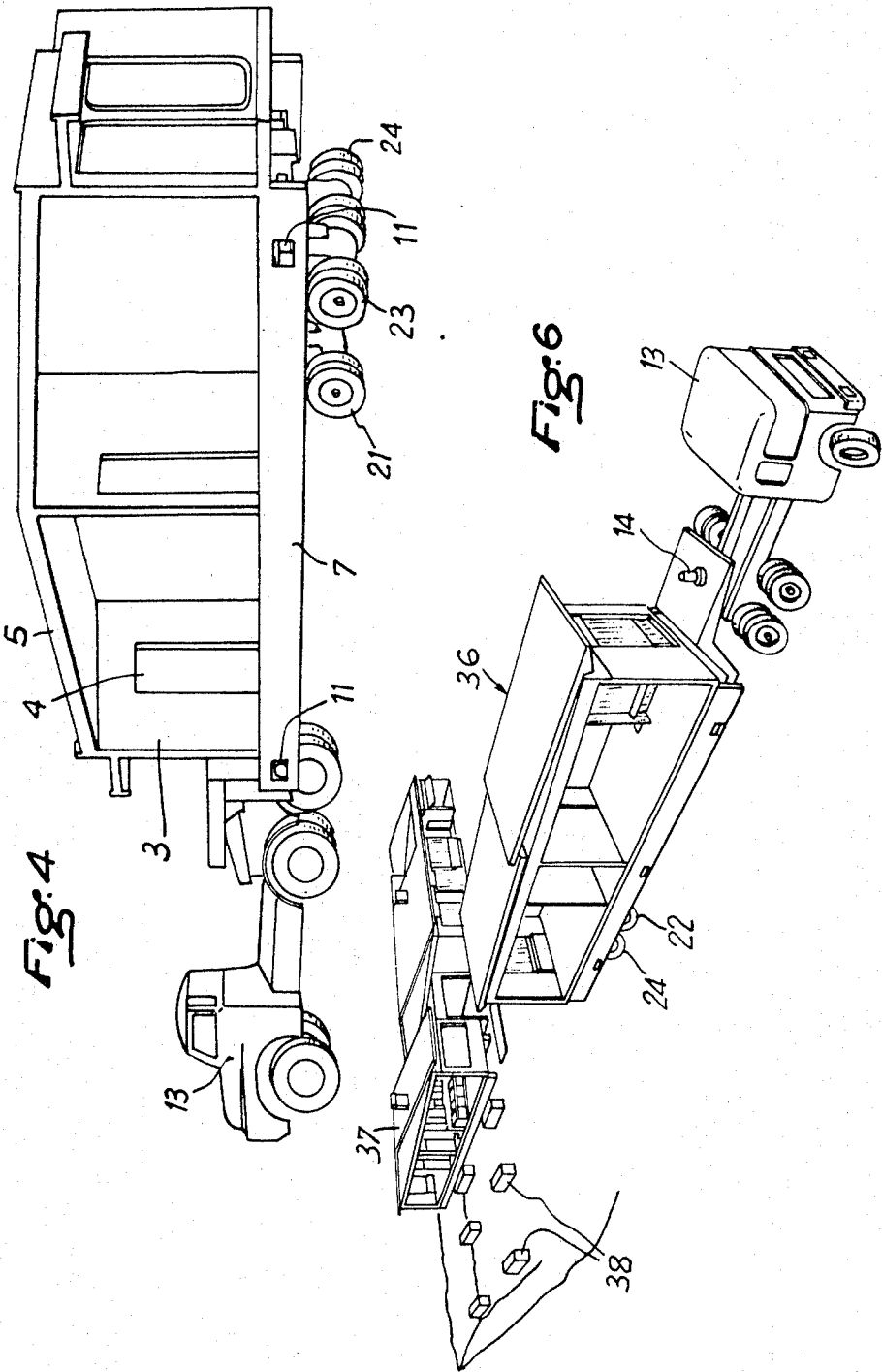

METHOD AND MEANS FOR CONSTRUCTING AND TRANSPORTING PRE-FABRICATED HOUSES

BACKGROUND OF THE INVENTION

The present invention relates to methods of constructing private individual houses consisting of relatively large prefabricated elements, and to the means for transporting and erecting these elements.

The advantages deriving from the industrial prefabrication, in specialized plants, of private houses consisting of relatively large concrete elements are well known. However, due to the unavoidable limitations imposed by transport and hoisting means, up to now this prefabrication was limited essentially to panels or like elements. These panels may comprise finished faces and revetments, and incorporate miscellaneous equipments, but considerable labor would still be necessary for positioning and assembling them on the building site; therefore a prefabrication industry concerning such large elements was successful only for collective buildings comprising a great number of flats in superposed storeys, the building sites comprising heavy-duty and therefore costly hoisting equipments obviously ill-suited for constructing relatively low-priced individual private houses.

SUMMARY OF THE INVENTION

The present invention relates to an improved building method utilizing relatively large prefabricated elements particularly suited for single-storey private houses. This method consists essentially in constructing the house elements not in the form of single, conventional panels comprising for example separate panel elements for the floors, outer walls and roofing, but as complete volumes each extending throughout the height of the house, so as to cover each one fraction of the house surface, whereby said elements comprise the floor, the side walls, the roof and the internal equipments, such as plumber work, sanitary apparatus, heating appliances, electrical and wiring systems and devices, and possibly the wall paper, lining and other revetments.

Thus, each element may comprise for example a complete room of relatively reduced dimensions or one-half of a larger room with vertical partitions disposed within the surface area, in plane view, of the element.

These elements are transported preferably on a trailer comprising a vertically movable platform, without resorting to any other hoisting apparatus. They are subsequently laid and positioned on the building site with precision, and completing the construction consists simply in making adequate seals or joints in the vertical planes interconnecting the adjacent elements.

The component elements are basically of elongated configuration, for example of rectangular shape in plane view, and of a width within the limits of road transport regulations, notably in the case of exceptional or maximum permissible structures of road vehicles.

To permit the above-defined transport this invention provides, at the base of each element, beneath its floor and on either side, an integral longitudinal beam for supporting the element during its construction at the manufacturing plant, its transport and positioning on a suitable foundation or bed at the building site.

These beams are advantageously provided with cavities or recesses engageable by transversely movable cross members incorporated in the movable platform of the transport trailer, so that when these carrier cross members are in their retracted position the over-all width of the trailer does not exceed the permissible maximum width, for instance 2.50 m, so that the trailer can be returned to the plant in its empty state without having to meet the severe requirements of exceptional transport regulations.

Furthermore, the present invention contemplates the use of a trailer specially designed for transporting the elements according to this invention and facilitating the accurate positioning thereof without resorting to any auxiliary hoisting means or equipments.

To this end, the trailer comprises advantageously a rectangular platform, for example 8 meter long, supported at its front end by its pintle coupling with the tractor or, if the tractor is not present, by props bearing on the ground, and at its rear end by a pair of axles comprising each two four-wheeled swivel or steering half-axles. The platform bears on the four half-axles through the medium of four jacks, the right-hand jacks being adapted to be actuated independently of the left-hand ones. As a result, the platform is vertically movable and may assume different inclinations in relation to the ground in both transverse and longitudinal directions.

On the other hand, the trailer is extensible longitudinally and to this end its chassis comprises a pair of telescopic longitudinal members or beams of which the sliding extensions can be locked in the desired position by means of pins operable from outside, the variation in length being obtained, after removing the pins, by locking the two rear axles and pulling or pushing the front end by means of the tractor.

With this construction it is clear that a house element according to this invention can be transported by engaging the trailer platform under the element so as to subsequently lift and transport it to the selected building site where the element is deposited upon a base structure or platform prepared to this end.

BRIEF DESCRIPTION OF THE DRAWINGS

A clearer understanding of this invention may be add if reference is made to the accompanying drawings in which:

FIG. 1 is a cross section showing diagrammatically a house element prefabricated at the manufacturing plant;

FIG. 2 is a side elevational view showing the truck and trailer assembly utilized for transporting the elements according to this invention;

FIG. 3 is a corresponding fragmentary plan view of the trailer;

FIG. 4 is a perspective view showing the tractor and the trailer during the transport of a prefabricated element;

FIG. 5 is a fragmentary perspective view from the rear of the trailer, during the loading of an element at the manufacturing plant before transporting same to the building site, and FIG. 6 is a perspective general view showing the delivery of a prefabricated element to the building site.

DESCRIPTION OF THE PREFERRED EMBODIMENT

As shown in FIG. 1, the element prefabricated in the manufacturing plant comprises a molded reinforced-concrete structure incorporating notably a floor 1, a longitudinal wall 2, transverse walls 3 or partitions formed with the necessary apertures 4 for the doors and windows, and a roof or like covering 5. In the example illustrated in the Figure the building element 5 comprises an open side, opposite wall 2, which is to be completed on the spot by another element to be coupled with this element along the vertical joint plane 6. Moreover, beneath the floor 1, the element comprises integral longitudinal beams 7, 8 disposed in parallel, spaced relationship and adapted, at the manufacturing plant, to be supported by groundways or like beams 9, 10 provided to this end on a floor or a suitable strengthening revetment, for example of reinforced concrete. The beams 7, 8 are formed with transverse cavities 11, 12, for example adjacent their ends, adapted to be engaged by the extensible cross members of the transport trailer to be described presently.

From the foregoing it is already clearly apparent that the prefabricated element constitutes a complete volumetric unit, from floor to roof; therefore, it can not only be finished at the works with any desired wall-covering or lining, but also with any desired floor or surface carpets, revetments, etc., including the ceiling, and more particularly with all the necessary equipments such as heating system, water supply pipings, wiring devices and appliances, and all sanitary or bathroom ensembles including all usual household apparatus and fixtures, ready for use. As these ensembles, apparatus and appliances are extremely variable it is not deemed necessary to show them in detail in the drawings.

An obvious and advantageous consequence of the complete finishing of the volumetric units constituted by the building elements of this invention is to reduce the assembling work on the building site to a simple making of joints only in the vertical planes along which the various elements constituting the final house are interconnected.

FIGS. 2 and 3 illustrate a typical example of a trailer according to this invention, suitable for transporting these elements. The reference numeral 13 designates the tractor provided with a pair of rear axles each comprising four wheels, and adapted to receive the pintle 14 of the trailer which is carried by the arm 15 pivoted at 16 to the swan-or gooseneck front element 17 of the trailer chassis to which said arm 15 is connected through a hydraulic cylinder and piston unit 18. The trailer chassis comprises a relatively long platform 19 extensible and adapted to be locked in four positions ; this platform is provided at its front end with a pair of props 20 and is supported at its rear end by two main axles comprising each two four-wheel steering or swivel half-axles. The two half-axles of the first main axle are designated by the reference numerals 21, 22 and the other two by the refererence numerals 23, 24. The platform is suspended from the half-axles by means of four vertical hydraulic cylinder-and-piston actuators shown diagrammatically at 25, 26, 27 and 28, disposed between the platform and the bearing turn-tables of the steering trains of wheels. These trains of wheels are steered through the medium of a pair of transverse hydraulic cylinder-and-piston units 29, 30. All these hydraulic cylinder-and-piston units or actuators are controlled by means of conventional circuits responsive to pressure-fluid distributors controlled in turn from a suitable switchboard equipped with control knobs, according to the known technique (not shown).

The normal or permissible width of the trailer may be 2.50 meters, for instance, but its platform comprises on either side and adjacent its front and tail ends transversely movable cross-members 31, 32, 33 and 34 responsive to other hydraulic cylinder and piston units 35. The extension of these cross-members for engagement in the above-defined cavities 11, 12 permits of increasing the width of platform 19, up to, say, 3.40 meters. By way of example, the platform length may be 8 m. and the overall length of the tractor and trailer assembly may be 15 m., according to the Highway Code of most Countries. However, these dimensions are easily adaptable to the rules of the Highway Code of the particular Country in which the vehicle is to be constructed and exploited.

As illustrated in FIG. 2, the trailer chassis comprises a pair of telescopic longitudinal beams, i.e. provided with sliding extensions 39 adapted to be locked in one of a plurality of positions by means of pins 40 to which access may be had from the exterior. It is therefore clear that this arrangement permits of modifying the length of the trailer according to circumstances.

The arrangement of the hydraulic hoisting jacks 25 to 28 associated with platform 19, in combination with the front actuator 18, permits on the one hand of varying at will the level of said platform 19 above the ground and on the other hand of canting this platform longitudinally and/or transversely. Thus, with the provision of the steering trains of wheels of the trailer, the latter can easily be set in an accurately defined position and a proper actuation of said jacks 25 to 28 will enable the operator to impart exactly the desired position to the element 36 carried by said platform. It may also be pointed out that, as the loaded element 36 is supported by the widening cross-members 31 to 34, it is possible to produce minor transverse movements of this element 36 in relation to the platform 19 for modifying the final position thereof at the building site, if necessary.

The manner in which an element 36 is transported will become readily apparent from the above description. Therefore, a brief description of this transport procedure will be sufficient for a proper understanding thereof. To load the trailer with an element at the manufacturing plant, the trailer is backed until its platform is inserted under the floor, between the longitudinal beams 7, 8 ; then, the platform is lifted in order to bring the movable cross-members 31, 34 level with the cavities 11, 12, and the lateral outward extension of these cross members is controlled to cause their engagement into said cavities 11, 12. The platform 19 is then lifted again to separate the element 36 from its groundway or like supporting members 9, 10 (FIG. 5), whereafter the element can be moved forwards. When it is clear of said groundway or like supporting members 9, 10, the platform 19 can be lowered to a level suitable for road transport conditions, and the trailer coupled to the tractor 13 can be driven for conveying the complete assembly to the building site, as shown in FIG. 4.

At the delivery or building site, the element 36 is positioned and lowered on the base structure or platform, or longitudinal supports, by effecting the same manoeuver or sequence of steps as described hereinabove for the picking up of the element at the plant, but in the reverse order. FIG. 6 illustrates the backing of the tractor and trailer assembly for bringing the element 36 to a position closely adjacent to that of another element 37 already positioned on the building site. The trailer is backed to the exact desired position and the driver may be assisted by an operator standing near the tractor 13 and by another operator disposed near the rear end of the trailer and controlling means for actuating the hydraulic devices for adjusting the vertical position of platform 19 and its orientation in a horizontal plane. When the longitudinal beams 7, 8 are properly aligned with the underlying longitudinal members 38 provided for supporting the element 36, the trailer platform is lowered until the beams 7, 8 bear upon the members 38. Under these conditions it is clear that the extensible cross-members 31–34 can then be retracted within the platform and that the trailer can be moved forwards and away from the now supported element 36. To complete the assembling of the new element 36 with the preceding element 37, if any, it is only necessary to make a suitable seal in the vertical joint plane formed therebetween.

When the trailer is returned to the manufacturing plant, its width is reduced to the maximum dimensions consistent with existing regulations for normal road vehicles, for example 2.50 m., so that the return journey can take place without having to comply with all the formalities imposed to exceptional road transports.

What I claim is:

1. A trailer comprising; a chassis, an element handling platform on the chassis, steerable rear wheels on half-axles controlled by transverse hydraulic cylinder and piston actuators mounted thereto, hydraulic jacks vertically mounted on the half-axles for supporting said platform and independently controlled for varying the cant of the platform relative to the ground, a gooseneck mounted to the front of the trailer, an arm pivotally attached at one end to the gooseneck, a pintle mounted to the arm at the other end and a hydraulic cylinder and piston unit pivotally attached to the gooseneck and arm for vertically adjusting the orientation of the platform in cooperation with rear half-axle mounted jacks.

2. Trailer as set forth in claim 1, wherein said platform comprises a plurality of transversely movable cross-members adapted to project beyond the normal width of said platform and to support the element to be transported, said cross-members being adapted to be actuated by means of transverse hydraulic cylinder and piston units.

3. Trailer as set forth in claim 1, wherein said chassis is longitudinally extensible in that it comprises a pair of telescopic longitudinal members adapted to be locked in the selected position by means of pegs accessible from outside.

* * * * *